United States Patent

[11] 3,595,028

[72] Inventor Paul D. Schrader
 Louisville, Ky.
[21] Appl. No. 863,218
[22] Filed Oct. 2, 1969
[45] Patented July 27, 1971
[73] Assignee General Electric Company

[54] CONTROL MEANS FOR AIR-CONDITIONING SYSTEM
 6 Claims, 2 Drawing Figs.
[52] U.S. Cl. .................................................. 62/176,
  62/209, 62/227, 62/229
[51] Int. Cl. .................................................. F25d 17/04
[50] Field of Search .......................................... 62/140,
  156, 176, 180, 208, 209, 227

[56] References Cited
UNITED STATES PATENTS
3,203,195 8/1965 Armentrout................. 62/156
3,335,576 8/1967 Phillips....................... 62/209
3,427,818 2/1969 Erickson..................... 62/140
3,453,837 7/1969 Sandstrom................... 62/140

Primary Examiner—Meyer Perlin
Attorneys—James E. Espe, Harry F. Manbeck, Frank L. Neuhauser, Oscar B. Waddell and Joseph B. Forman ABSTRACT: In an air conditioner there is provided a thermistor to sense the dry bulb temperature of the air entering the evaporator coil and another thermistor to sense the dry bulb temperature of the air leaving the evaporator coil. The thermistors are electrically connected into a control circuit so that the air conditioner is controlled by the combined resistance of the two thermistors. The air conditioner is thus controlled in response to both the temperature and the humidity of the air being cooled.

PATENTED JUL 27 1971
3,595,028
FIG.1
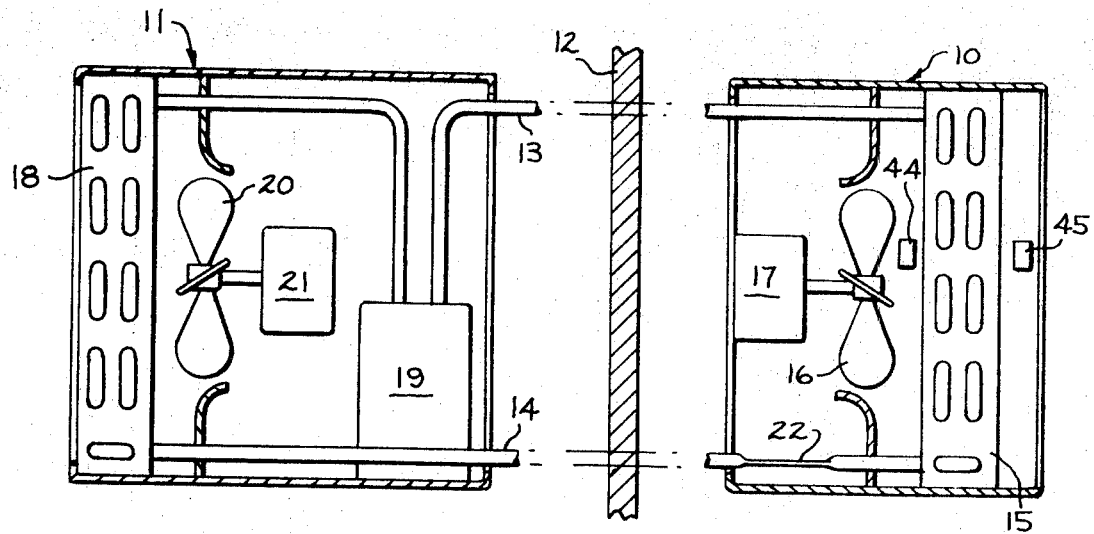
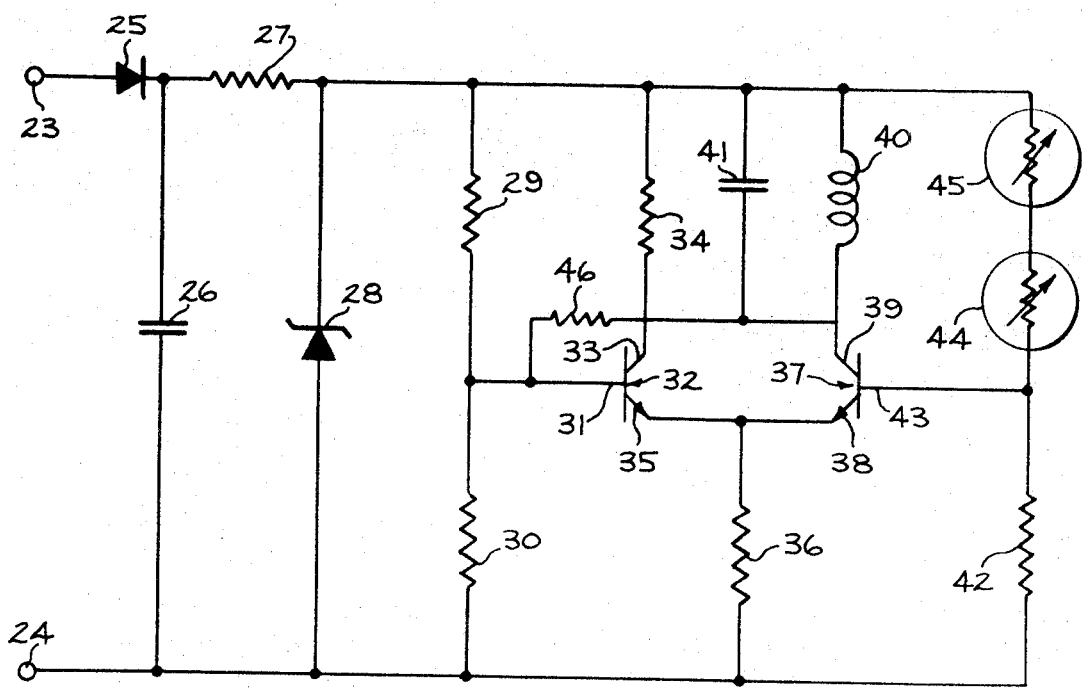
FIG.2
INVENTOR.
PAUL D. SCHRADER
BY
James E. Espe
HIS ATTORNEY

CONTROL MEANS FOR AIR-CONDITIONING SYSTEM

BACKGROUND OF THE INVENTION

For comfortable conditioning of residences, offices or similar spaces, it is desirable to control the operation of the conditioning means not only from the temperature standpoint but from the standpoint of humidity as well. This can be accomplished, of course, by incorporating a humidistat into the control system; however, a humidistat is a relatively expensive and relatively unreliable component. Moreover, the control circuit may become undesirably complicated by the incorporation of a humidistat, particularly if the control circuit is comprised of solid-state devices. Because of this, there has not been a general move toward providing air-conditioning controls wherein control is a function of both the humidity and the temperature of the air being conditioned.

It is therefore, an object of this invention to provide, in an air-conditioning system control means wherein control is a function of both the humidity and the temperature of the air being conditioned.

It is another object of this invention to provide such a control means utilizing low-cost solid-state devices.

SUMMARY OF THE INVENTION

Briefly stated, in accordance with one aspect of this invention, there is provided an improved control means for an air-conditioning system having a heat exchanger to cool air passing therethrough. The control means includes a first sensing means to sense the dry bulb temperature of the air entering the heat exchanger and a second sensing means to sense the dry bulb temperature of the air leaving the heat exchanger. Means are provided to deenergize the air-conditioning system in response to the concurrent temperature conditions sensed by the two sensing means. With this arrangement, control of the energization of the air-conditioning system is a function of both the humidity and the temperature of the air being cooled.

BRIEF DESCRIPTION OF THE DRAWING

While the specification concludes with claims particularly pointing out and distinctly claiming the subject matter which is regarded as the invention, it is believed the invention will be better understood from the following description of the preferred embodiment taken in connection with the accompanying drawing, in which:

FIG. 1 illustrates an air-conditioning system with which the present invention may be utilized; and, FIG. 2 is a schematic wiring diagram of control circuitry embodying the present invention.

DESCRIPTION OF THE PREFERRED EMBODIMENT

Referring now to the drawing, and initially to FIG. 1 thereof, there is illustrated an air-conditioning system including an indooor unit 10 and an outdoor unit 11 positioned on opposite sides of a wall 12 and interconnected by refrigerant conduits 13 and 14. Indoor unit 10 includes a heat exchanger 15 operating as an evaporator and a fan 16 driven by an electric motor 17 for circulating air to be conditioned through the heat exchanger 15 and supplying the conditioned air to the enclosure. The outdoor unit 11 comprises an outdoor heat exchanger 18 operating as a condenser and a hermetic compressor 19 driven by an electric motor hermetically sealed within a compressor housing. A fan 20 driven by a motor 21 is provided for circulating outdoor air over heat exchanger 18 for the purpose of cooling and condensing refrigerant contained therein.

In such a system, the compressor 19, condenser 18, a flow restrictor such as a capillary tube 22, and the indoor heat exchanger 15 are connected in closed, series-flow refrigerant circuit whereby the compressor withdraws vaporized refrigerant from the indoor heat exchanger 15 functioning as an evaporator and discharges warm high-pressure refrigerant to the outdoor heat exchanger 18 in which it is cooled and condensed by the air circulated through that heat exchanger by means of fan 20. The condensed refrigerant is supplied through the flow restrictor 22 to the indoor heat exchanger 15 where it evaporates and thereby cools the air circulated through the indoor heat exchanger by means of the fan 16.

The refrigeration system described above is, of course, substantially conventional. The indoor unit and the outdoor unit may be combined into a single cabinet to extend through the wall or through a window, such an arrangement being generally denoted a room air conditioner. Also, the indoor unit and the outdoor unit may be separated physically with the indoor unit incorporated into a warm air furnace to provide cooling for an entire residence or plurality of individual offices. Normally, with either one of these arrangements, a thermostat is provided to control operation of the air conditioner in response to the temperature of the air within the enclosure being conditioned. In the case of a central air-conditioning unit, the thermostat is usually remote from the unit and mounted on a wall to sense the temperature within the room. In a room air conditioner, the thermostat is frequently incorporated into the air conditioner cabinet to sense the temperature of the air entering the cabinet from the room, i.e., the temperature of the air entering the indoor heat exchanger. As mentioned above, such arrangements do not take into consideration the humidity of the air within the enclosure being conditioned and, on hot humid summer days, control of the humidity is almost as important as control of the temperature.

In accordance with the present invention, there is provided a control system which will provide a control in which humidity is a control factor.

Referring now to FIG. 2, there is schematically illustrated a control circuit with which the present invention may be utilized to control an air-conditioning system in such a fashion that energization of the air-conditioning system is a function of both the humidity and the temperature of the air being conditioned.

A standard source of alternating current (120 v. AC) may be applied to terminals 23 and 24 which connect to a DC-regulated voltage power supply comprising a rectifying diode 25, a filter capacitor 26, a dropping resistor 27, and a voltage-regulating zener diode 28 which are adapted to supply a low DC voltage output to the remaining elements of the control circuit.

The output of the low voltage DC power supply is applied to a voltage divider comprising resistors 29 and 30 which provides a fixed base voltage to the base 31 of a reference transistor 32. Transistor 32, in addition to base 31, has a collector 33 connected to the positive side of the DC voltage supply through a resistor 34, and an emitter 35 connected to the negative side of the DC voltage supply through a resistor 36.

A load transistor 37 has its emitter 38 also connected to the negative side of the DC voltage supply through resistor 36. The collector 39 of transistor 37 is connected to the coil 40 of a relay for controlling the energization of the compressor 19 of the air-conditioning system of FIG. 1. Preferably, coil 40 is part of a reed relay and preferably has an effective resistance approximately equal to the resistance of resistor 29. A capacitor 41 shunts coil 40 for filtering purposes.

A voltage divider circuit is also provided for load transistor 37 and includes a resistor 42 connecting the base 43 of transistor 37 to the negative side of the DC power supply, and two thermistors 44 and 45 serially connected between base 43 and the positive side of the low voltage DC power supply. Resistor 42 and thermistors 44 and 45 comprise a variable voltage divider to supply a voltage to base 43 which depends upon the combined resistances of thermistors 44 and 45. These resistances, of course, depend upon the temperatures sensed by thermistors 44 and 45 and, in accordance with the present invention, thermistors 44 and 45 are positioned within the indoor unit 10 so as to serve as temperature-sensing means. Thermistor 44 is positioned to serve as a sensing means to sense the dry bulb temperature of the air entering heat exchanger 15 and thermistor 45 is positioned to serve as a sensing means to sense the dry bulb temperature of the air leaving the heat exchanger 15.

Transistors 32 and 37 are connected to provide, in effect, a differential amplifier. To increase the gain of this differential amplifier circuitry, there is provided a feedback circuit including a feedback resistor 46 connecting collector 39 of load transistor 37 to base 31 of reference transistor 32.

In the illustrated circuitry, thermistors 44 and 45 each have a negative temperature coefficient so that its resistance decreases with increased temperature. When the combined resistance of thermistors 44 and 45 is relatively high due to the fact that the temperatures being sensed are within a satisfactory range, base 43 will be sufficiently negative so that transistor 32 will be "on" and load transistor 37 will be "off." The relay coil 40 will therefore be deenergized and the circuit to the compressor 19, and other appropriate electrical components of the air-conditioning system, will be opened. Upon a sufficient increase in temperature sensed by either or both of thermistors 44 and 45, a decrease in the combined resistance thereof will be manifested. Thus, base 43 of load transistor 37 will become more positive and transistor 37 will turn "on" and thereby turn transistor 32 "off." The load transistor 37 will remain turned "on" until the combined resistance of thermistors 44 and 45 again increases to a point where the base 43 of transistor 37 becomes sufficiently negative to reverse this action. When transistor 37 is fully turned "on," the voltage across feedback resistor 46 is essentially zero so that the voltage supplied to the base 31 of transistor 32 is essentially controlled by the values of resistors 29 and 30. When transistor 37 is turned "off" and transistor 32 is turned "on," the voltage across feedback resistor 46 is approximately the same as that across resistor 29 since the resistance of coil 40 is small as compared with the resistances of resistors 29 and 46. As a result, there is produced an increase of voltage at the base 31 of transistor 32 and this voltage is in phase with the action. During the turning "on" of the transistor 32, its base voltage is increased by the feedback causing it to turn "on" faster. Thus, depending upon the value of the resistors 29, 30, and 46, the gain in the differential amplifier can be increased independently of the gains in transistors 32 and 37.

Thermistor 44 serves as a sensing means to sense the dry bulb temperature on the upstream side of heat exchanger 15 and thermistor 45 serves as a sensing means to sense the dry bulb temperature on the downstream side of heat exchanger 15. That is, neither thermistor is dampened so as to provide a wet bulb measurement. However, because of the positioning of the thermistors one on either side of heat exchanger 15, the humidity of the air passing through heat exchanger 15 becomes a factor in the total resistance of thermistors 44 and 45 and thus becomes a factor in the energization or deenergization of coil 40 which in turn controls the air-conditioning system. When heat exchanger 15 is functioning as an evaporator, or cooling device, the temperature sensed by thermistor 45 will be a function not only of the temperature of the air entering heat exchanger 15, but also the humidity of the air entering heat exchanger 15 because as the humidity of the air varies, the temperature sensed by thermistor 45 will vary. As the humidity of the air decreases, the temperature sensed by thermistor 45 will decrease and, as the humidity of the air increases, the temperature sensed by thermistor 45 will increase. The reason for this is that the heat absorbed by heat exchanger 15 is realized partially in a temperature drop of the air passing therethrough and partially as a decrease in the humidity of the air passing therethrough. In other words, at least part of the heat absorbed by heat exchanger 15 is the heat of vaporization given up by the air as the moisture is condensed therefrom onto the cold surfaces of heat exchanger 15.

Relating the foregoing to the control circuitry of FIG. 2, it can be seen that if the humidity of the air passing through heat exchanger 15 is relatively high, then that portion of the total resistance of thermistors 44 and 45 provided by thermistor 45 will be relatively low because thermistor 45 will be sensing a relatively high dry bulb temperature since a larger portion of the heat absorbed by heat exchanger 15 will have gone into condensing moisture from the air. Similarly, the combined resistances of thermistors 44 and 45 will be higher when the humidity of the air passing through heat exchanger 15 is lower because more of the heat absorbed by heat exchanger 15 will have gone into cooling the air and less will have gone into dehumidifying the air. Thus, because it is the combined resistances of thermistors 44 and 45 which provide a control voltage for the circuit of FIG. 2, the humidity of the air passing through heat exchanger 15 becomes a factor in the energization or deenergization of relay coil 40 which, of course, makes it a factor in the energization and deenergization of the air-conditioning system.

It will be appreciated that many modifications can be made to the control circuitry of FIG. 2 without departing from the concept of sensing the dry bulb temperature of the air entering the heat exchanger and sensing the dry bulb temperature of the air leaving the heat exchanger. For example, the two thermistors could be connected in a bridge circuit or in parallel rather than in the precise serially connected arrangement illustrated in FIG. 2. Moreover, solid-state devices other than transistors 32 and 37 could be employed as long as means to sense the dry bulb temperatures as described are used.

It should now be apparent that the present invention provides an improved control means for an air conditioning system which, by the relatively inexpensive expedient of providing two thermistors, control of the air-conditioning system becomes a function of both the humidity and the temperature of the air being conditioned.

It should be apparent to those skilled in the art that while there has been described what, at present, is considered to be the preferred embodiment of this invention in accordance with the patent statutes, changes may be made in the disclosed apparatus without actually departing from the true spirit and scope of this invention.

What I claim as new and desire to secure by Letters Patent of the United States is:

1. In an air-conditioning system, including a refrigeration system comprising a compressor, a condenser and a heat exchanger to cool air passing therethrough, control means comprising:
   first sensing means to sense the dry bulb temperature of the air entering said heat exchanger,
   second sensing means to sense the dry bulb temperature of the air leaving said heat exchanger,
   and means to deenergize and energize the air-conditioning refrigeration system compressor in response to the concurrent temperature conditions sensed by said first sensing means and said second sensing means such that control of the energization of the air-conditioning refrigeration system compressor is a function of both the humidity and the temperature of the air being cooled.

2. The invention of claim 1 wherein said means to deenergize and energize the air-conditioning refrigeration system compressor comprises a control circuit including at least one solid-state device to control energization of the air-conditioning refrigeration system compressor and said first and second sensing means comprise thermistors, said thermistors providing a combined resistance which controls said solid-state device.

3. The invention of claim 1 wherein at least one of said sensing means comprises a thermistor and said means to deenergize and energize the air-conditioning refrigeration system compressor comprises a control circuit responsive to the resistance of said thermistor.

4. The invention of claim 1 wherein said heat exchanger comprises an evaporator.

5. The invention of claim 4 wherein said first sensing means comprises a thermistor upstream of said evaporator with respect to the airflow therethrough and said second sensing means comprises a thermistor positioned downstream of said evaporator with respect to the airflow therethrough.

6. In control means for controlling the operation of an air conditioner having a refrigeration system including a compressor, a condenser and an evaporator for cooling air passing therethrough with said control means including electrical components electrically interconnected to deenergize and energize said air conditioner refrigeration system compressor in response to variation of resistance interconnected with said electrical components, the improvement comprising:

a first thermistor positioned upstream of the evaporator to sense the dry bulb temperature of the air entering the evaporator, a second thermistor positioned downstream of the evaporator to sense the dry bulb temperature of the air leaving the evaporator, and means electrically interconnecting said first thermistor and said second thermistor with the electrical components such that said first thermistor and said second thermistor jointly provide the resistance in response to the variation of which the air conditioner refrigeration system compressor is deenergized and energized.